United States Patent [19]

Difonzo et al.

[11] Patent Number: 4,918,395
[45] Date of Patent: Apr. 17, 1990

[54] MULTIPASS LASER AMPLIFIER WITH AT LEAST ONE EXPANDED PASS

[75] Inventors: John C. Difonzo, San Mateo County; Bertram C. Johnson, Sunnyvale, both of Calif.

[73] Assignee: Spectra-Physics, San Jose, Calif.

[21] Appl. No.: 274,407

[22] Filed: Nov. 21, 1988

[51] Int. Cl.$^4$ ............................................. H01S 3/08
[52] U.S. Cl. .................................. 330/4.3; 372/92
[58] Field of Search ................. 330/4.3; 372/25, 92

[56] References Cited

U.S. PATENT DOCUMENTS

| | | | |
|---|---|---|---|
| 3,942,127 | 3/1976 | Fluhr et al. | 330/4.3 |
| 3,968,456 | 7/1976 | Welch | 330/4.3 |
| 4,019,151 | 4/1977 | Brueckner et al. | 330/4.3 |
| 4,142,191 | 2/1979 | Ward | 330/4.3 |
| 4,156,852 | 5/1979 | Hagen | 330/4.3 |
| 4,656,433 | 4/1987 | Franklin et al. | 330/4.3 |

OTHER PUBLICATIONS

Thomas James Kane, "Coherent Laser Radar at 1.06 Microns Using Solid State Lasers", Aug. 1986.

Heritier et al., "Thermal Effects in High Power Q-Switched Lasers".

Primary Examiner—Stephen C. Buczinski
Assistant Examiner—Mark Hellner
Attorney, Agent, or Firm—Fliesler Dubb Meyer & Lovejoy

[57] ABSTRACT

A laser amplifier with high gain and high power efficiency comprises a gain medium characterized by at least two optical paths through the gain medium. An optic supplies the input laser pulse along a first optical path, so that the laser pulse has a transverse dimension $D_i$ as it propagates along the first optical path and exits the gain medium as a first pass amplified pulse. A second optic expands the first pass amplified pulse in the transverse dimension to an expanded pulse with transverse dimension $D_e$, and guides the expanded pulse along a second optical path through the gain medium. The laser pulse exits the gain medium as a second pass amplified pulse. A third optic in a preferred system guides the second pass amplified pulse along a third optical path through the gain medium so that the laser pulse exits the gain medium as the output pulse.

47 Claims, 4 Drawing Sheets

FIG.-4 6-PASS

MULTIPASS LASER AMPLIFIER WITH AT LEAST ONE EXPANDED PASS

The present invention relates to laser amplifiers; and more particularly to laser amplifiers having multiple passes through gain media.

DESCRIPTION OF RELATED ART

Laser amplifiers transform a low power input beam or pulse of coherent radiation into a high power output beam. Such amplifiers are commonly used to amplify high quality, low power pulses of laser light such as may be generated by Q-switched, diode pumped YAG laser.

The laser amplifier operates by passing the input laser beam through a gain medium one or more times. Most laser gain media used in amplifiers are characterized by having a very high power gain for low input powers. As the input power increases, the gain decreases as the available energy within the gain media becomes saturated. However, in order to extract energy efficiently from the gain media it is desirable to have saturated the gain medium. Therefore, a very high gain laser amplifier does not efficiently extract energy from the gain medium because one design consideration for designing a high gain amplifier is to avoid saturation. Conversely, a high power laser amplifier typically has very low gain because it is working in the saturated or near saturated region.

One approach in the prior art of obtaining high gain and high energy efficiency is to utilize optics for guiding the beam through a single gain medium more than one time. The first pass through the gain medium is thus very high gain while the second pass through the gain medium is utilized to extract higher power efficiency. One such laser is exemplified by the high gain slab amplifier described in Kane, "Coherent Laser Radar at 1.06 Microns Using Solid State Lasers (thesis Stanford University 1986)" pages 91-121. The Kane slab amplifier avoids creating a laser oscillator cavity by having different optical paths through the slab medium.

Other prior art systems avoid establishing oscillation in multipass amplifiers by using the polarization dimension, rather than different optical paths. For instance, an input beam will make a first pass through a polarized plate, then a gain medium at a vertical polarization, be rotated 90 degrees, and then passed through the gain medium a second time. At the polarizer plate, the rotated, amplified beam is reflected out of the path of oscillation. See Heritier, et al., "Thermal Effects in High Power Q-Switched Lasers" presented at the January 1988 SPIE OE-LASE conference.

Using the polarization dimension for obtaining multiple paths through a single gain medium is difficult when the medium exhibits birefringence, such as N:YAG and many other solid state materials. The birefringence induces a component in the output beam that is not completely reflected out of the optical path by the polarizer and can result in unwanted oscillation within the cavity. In addition, more than one pass through the gain medium requires expensive non-reciprocal elements such as Faraday rotators and the like.

For a detailed discussion of laser amplification, see Siegman, LASERS, University Science Books, Mill Valley, Calif., 1986, pages 264-330. Accordingly, there is need for a high gain amplifier with a good power efficiency, which minimizes the problem of parasitic oscillations.

SUMMARY OF THE INVENTION

The present invention is an apparatus for amplifying a laser pulse to generate an output laser pulse with high gain and high power efficiency. The apparatus comprises a gain medium that has a first face and a second face, such as a rod of Nd:YAG. A first optical path between the first face and the second face, a second optical path between the first face and the second face, and a third optical path between the first face and the second face are defined through the gain medium. A first optic supplies the input laser pulse along the first optical path, so that the laser pulse has a transverse dimension $D_i$ as it propagates along the first optical path and exits the gain medium as a first pass amplified pulse. A second optic expands the first pass amplified pulse in the transverse dimension to an expanded pulse with transverse dimension $D_e$, and guides the expanded pulse along the second optical path through the gain medium. The laser pulse exits the gain medium as a second pass amplified pulse. A third optic guides the second pass amplified pulse along the third optical path through the gain medium so that the laser pulse exits the gain medium as the output pulse.

The second optic includes, according to one embodiment, a telescope and a polarizer plate. The telescope expands the first pass amplified pulse in the transverse direction. The polarizer plate reflects that component of the beam having the preferred polarization along the second optical path. According to this embodiment, the third optic rotates the polarization of the second pass amplified pulse and guides the beam along the third optical path, which is collinear with the second optical path. The rotated beam then passes through the polarizer plate in the second optic as the output pulse.

According to another aspect of the present invention, two gain media are included in the laser amplifier. The input pulse is guided through each gain medium one time with transverse dimension $D_i$, then expanded in the transverse dimension to $D_e$ and passed through each gain medium a second and third time in the expanded format. Thus, the two media amplifier provides for six passes through a gain medium for a single pulse providing very high gain and high power efficiency.

Alternative embodiments of the present invention can be implemented with two or more passes through a gain medium. At least one of the passes through the gain medium has the expanded transverse dimension. The low power passes through the gain medium have a small transverse dimension and achieve high gain. The expanded beam utilizes as much of the available volume of the gain medium as possible to achieve high power density.

Other aspects and advantages of the present invention can be seen from a study of the figures, the detailed description and the claims provided below.

DETAILED DESCRIPTION

Figure 1:
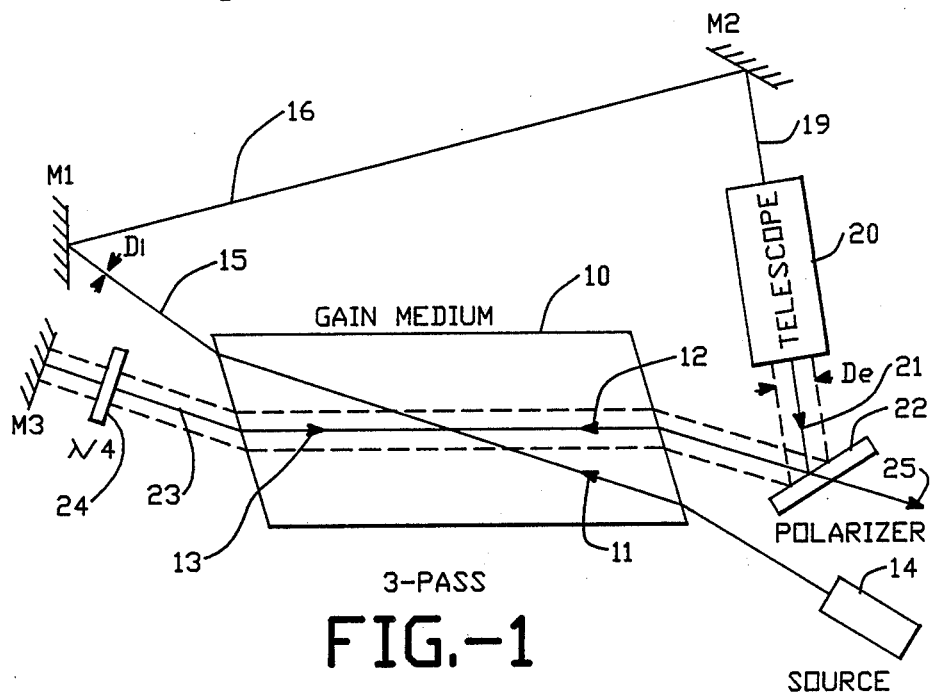
FIG. 1 is a schematic diagram of a three pass, single medium amplifier according to the present invention.
Figure 2:
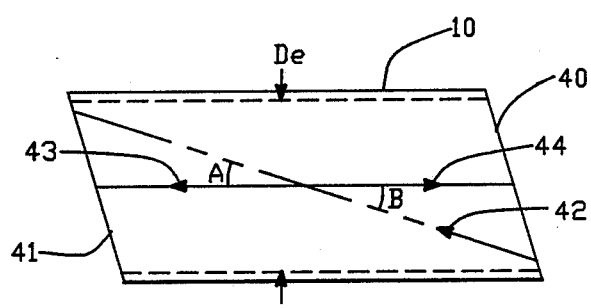
FIG. 2 is a diagram used to illustrate the characteristics of the optical paths through the gain medium according to the present invention.
Figure 3:
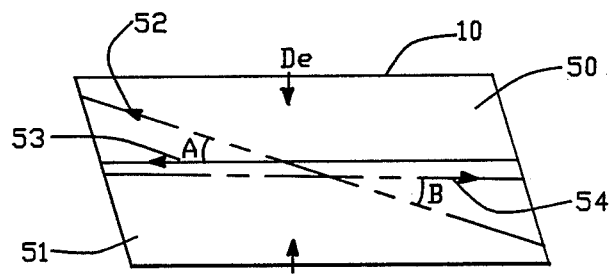
FIG. 3 is a diagram used to illustrate an alternative embodiment of optical paths through gain medium according to the present invention such as that used in the second amplifier rod of the embodiment of FIG. 5.
Figure 4:
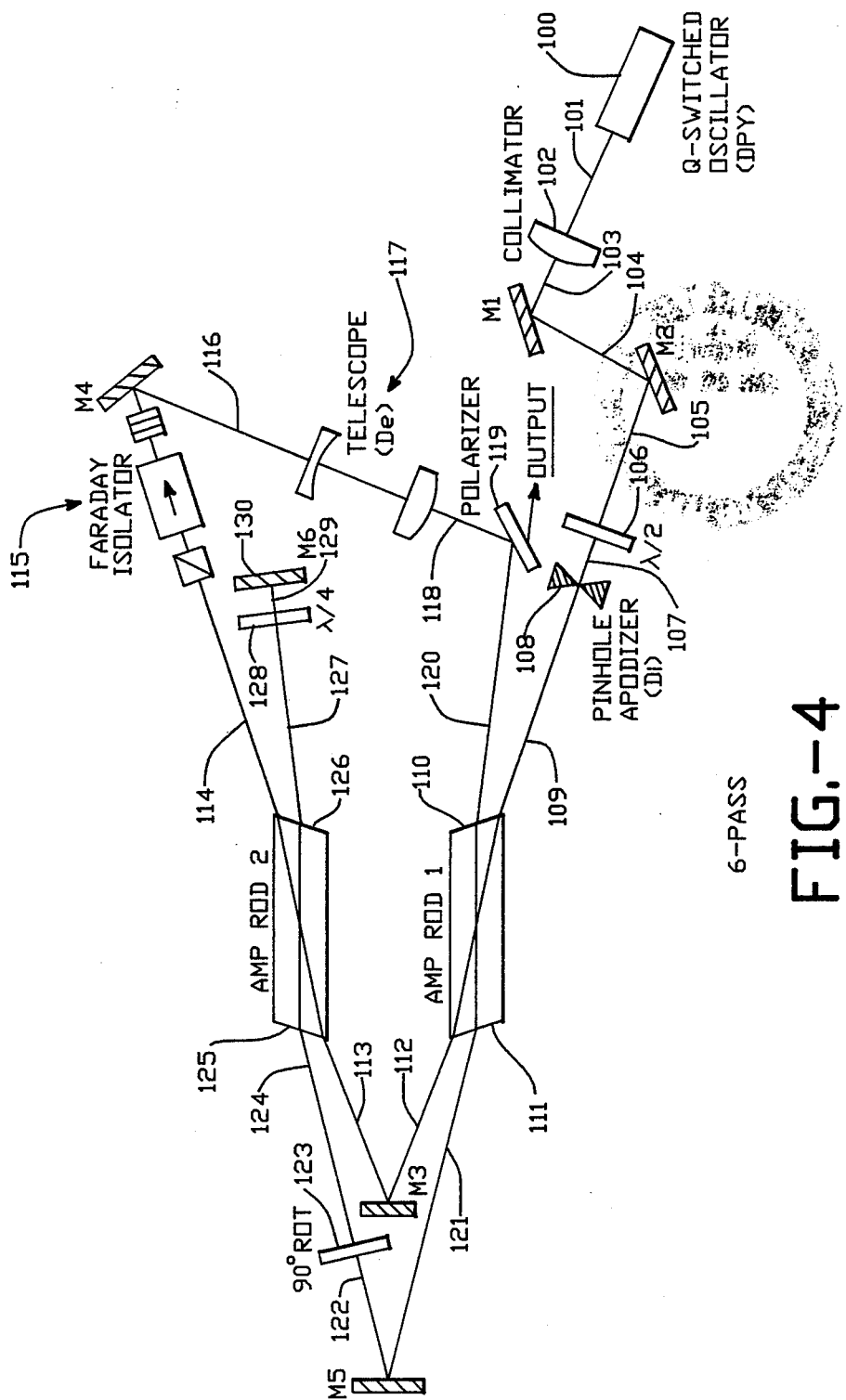
FIG. 4 is a diagram of a laser amplifier lay out for six pass amplification according to the present invention with two gain media.
Figure 5:
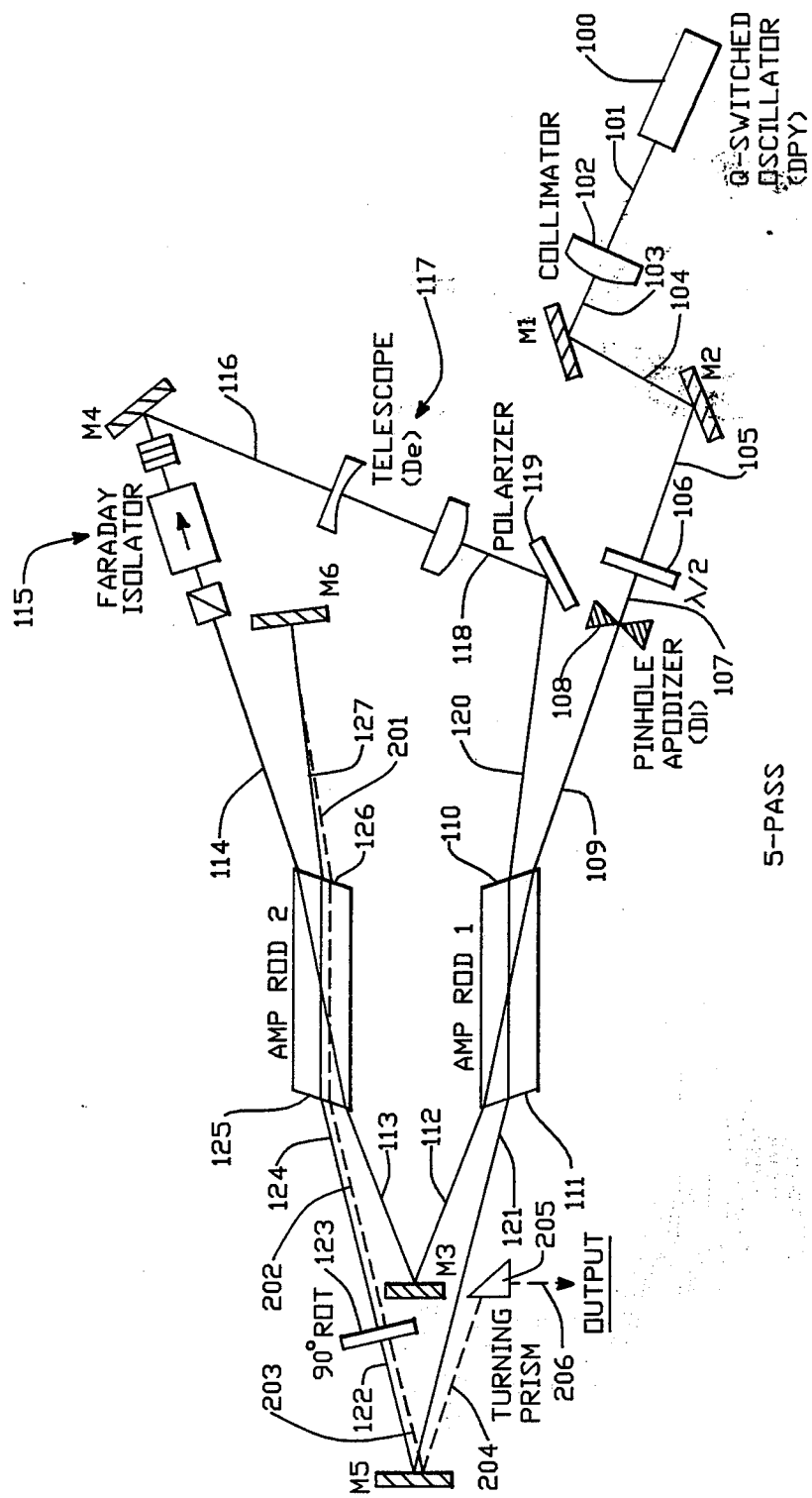
FIG. 5 is a diagram of a laser amplifier layout for a five pass amplification using two gain media according to the present invention.

A detailed description of preferred embodiments of the present invention is provided with reference to FIGS. 1-5. FIG. 1 is a three pass amplifier, FIG. 4 is a six pass amplifier and FIG. 5 is a five pass amplifier. FIGS. 2 and 3 are used to illustrate the optical paths through the gain media for the embodiments shown in FIGS. 1, 4 and 5.

FIG. 1 is simplified diagram of a multiple pass amplifier according to the present invention. The amplifier includes a gain medium 10, having an active region for amplification of an input beam.

The gain medium 10 can be characterized as having the first optical path 11, a second optical path 12, and a third optical path 13 through the active region of the gain medium to provide amplification of an input pulse passing along the respective paths.

The input pulse is provided from a source laser 14, such as a Q switched diode pumped YAG (DPY) laser. The input pulse passes through the gain medium 10 along the first optical path 11.

The input pulse leaves the gain medium along segment 15 as a first pass amplified pulse with a transverse dimension $D_i$ which is much smaller than the usable diameter of the gain medium 10. This small transverse dimension $D_i$ allows for the first optical path 11 to proceed off of the longitudinal axis of the gain medium 10 without intersecting the corners or sides of the gain medium 10.

The second pass amplified pulse on segment 15 is reflected by a first high reflecting mirror M1 along segment 16 to high reflecting mirror M2 along segment 19. Telescope 20 expands the transverse dimension of the beam to a value $D_e$ which is greater than $D_i$. The expanded beam is supplied along segment 21 and reflected by polarizer 22 into the gain medium along the second optical path 12 with a first polarization.

The expanded pulse passes along the second optical path 12 through the gain medium 10 and exits the gain medium as a second pass amplified pulse on segment 23. The second pass amplified pulse passes through a quarter-wave plate 24 with a first axis aligned 45 degrees from the first polarization, to high reflecting mirror M3. From high reflecting mirror M3, the beam is guided through quarter-wave plate 24 along the third optical path 13 through the gain medium 10. The pulse then exits the gain medium 10 as a third pass amplified pulse. Due to the polarization rotating effect of the quarter-wave plate 24 and mirror M3, the third pass amplified pulse will be transmitted by the polarizer 22 and provide an output beam 25.

In operation, a pulse will pass through the gain medium 10 along the first optical path with a small transverse dimension and experience very high gain due to the long effective path through the medium, and the low input power. In the second pass through the gain medium, the beam has an expanded transverse dimension $D_e$ and will utilize more of the available volume of the active region in the gain medium for amplification. In the preferred systems, the transverse dimension $D_e$ will result in utilization of greater than 75% of the active region of the gain medium. This increases the power efficiency of the amplifier. Further, the gain in the second pass can approach the saturation limit of the gain medium to extract as high a power output as possible. This second pass amplified beam could be supplied as an output for a specific system if desired. A third pass through the gain medium can be achieved in the polarization dimension by use of quarter-wave plate 24 and mirror M3. This third pass will operate very near or at the saturation limit of the gain medium to extract maximum power output.

FIG. 2 illustrates the optical paths through the gain medium 10. The gain medium 10 in a preferred system is a cylindrical rod with a first face 40 and a second face 41. First optical path 42 proceeds from the first face 40 to the second face 41 and occupies a very narrow region within the gain medium 10. The second optical path 43 occurs with an expanded beam with a dimension $D_e$ in the transverse direction. This dimension $D_e$ is as close as possible to the maximum transverse dimension of the active region in the gain medium 10 providing useful gain without interference from the edges and sides of the medium 10. Likewise, the third optical path 44 passes through the gain medium with the expanded dimension.

As shown in FIG. 2, the first optical path 43 and the second optical path 44 are collinear and are centered on the longitudinal axis of the medium 10. This allows for most efficient utilization of the available gain volume within the medium 10. In FIG. 2, the angle A between the first optical path 42 and the second optical path 43 and the angle B between the first optical path 42 and the second optical path 44 have equal absolute values.

FIG. 3 shows optical paths for the amp rod 2 shown in FIG. 5. In this system, the rod 10 includes a first face 50 and a second face 51. The first optical path 52 lies between the first face 50 and the second face 51, the second optical path 53 lies between the first face 50 and the second face 51, and the third optical path 54 lies between the first face 50 and the second face 51. In this embodiment, the second optical path 53 and third optical path 54 are not collinear. Rather, the first optical path makes an angle A with the second optical path and the third optical path 54 makes the angle B with the first optical path 52, where A is not equal to B. In this embodiment, the transverse dimension $D_e$ of the expanded pulse would be required to be smaller than that allowed in the embodiment of FIG. 2 so that the expanded pulse proceeding along the third optical path 54 is not affected by the edges or sides of the rod 10.

In the embodiment of FIG. 3, the second optical path is shown along the longitudinal axis of the rod 10. In an alternative system, a second optical path 53 and a third optical path 54 could be symmetrical about the longitudinal axis at the center of the rod 10. In this system, the angles A and B would be equal.

The transverse dimension $D_i$ and $D_e$ as referred to herein may be complicated functions of position along the respective optical paths, depending on the nature of gain media used and optics used for guiding the pulse through the amplifier. The dimension $D_i$ and $D_e$ are referred to in this simplified form to clarify the description of the present invention.

FIG. 4 is a schematic diagram of a six pass amplifier according to the present invention. In this six pass embodiment, two gain media, amplifier rod 1 and amplifier rod 2, are used to achieve amplification of a 5 microjoule pulse 10 nanoseconds long to an output pulse of 200 to 250 millijoules with very little pulse stretching or distortion. In addition, the amplifier utilizes near 50% of the available energy within the gain media.

The gain media are formed using Nd:YAG cylindrical rods 9.5 millimeters in diameter and 2 inches long. The rods were pumped using 90 joule per head xenon flashlamps. A 5 microjoule 10 nanosecond pulse is generated by a Q switched DPY oscillator 100. The pulse is supplied along segment 101 to a collimator 102. From the collimator 102, the beam is supplied along segment 103 to high reflecting mirror M1, and from mirror M1 along the segment 104 to high reflecting mirror M2. Mirrors M1 and M2 are used for precise aligning of an input beam to the amplifier.

Thus the pulse is reflected off mirror M2 along segment 105 through a half-wave plate 106 along segment 107 through a pin hole apodizer 108. The half-wave plate 106 is used for adjustment of polarity of the input beam as described below. The pin hole apodizer 108 is used to provide a known transverse dimension $D_i$ of the input pulse.

From the pin hole apodizer 108, the input pulse is supplied along segment 109 to a first face 110 of amplifier rod 1. The input pulse passes along a first optical path as described with reference to FIG. 2 and exits a second face 111 of the rod 1 as a first pass amplified pulse. The first pass amplified pulse proceeds along segment 112 to high reflecting mirror M3. From high reflecting mirror M3 the pulse is directed along segment 113 and through a first optical path through rod 2 as described with reference to FIG. 2. The pulse exits rod 2 as a second pass amplified pulse on segment 114.

The second pass amplified pulse on segment 114 passes through Faraday isolator 115 to high reflecting mirror M4. From high reflecting mirror M4, the pulse is guided along segment 116 to telescope 117. The telescope 117 expands the beam symmetrically to transverse dimension $D_e$ along segment 118. The expanded pulse then reflects off polarizer plate 119 along segment 120. From segment 120, the expanded pulse enters the first face 110 of rod 1 along a second path through rod 1, and exits the second face 111 of rod as a third pass amplified pulse along segment 121.

The third pass amplified pulse is guided by mirror M5 along segment 122 to 90 degree rotator 123. From 90 degree rotator, the rotated and expanded pulse is supplied along segment 124 to a first face 125 of amplifier rod 2. The expanded, rotated pulse proceeds along a second path through rod 2, then exits amplifier rod 2 at the second face 126 along segment 127 as a fourth pass amplified pulse. The fourth pass amplified pulse goes through quarter-wave plate 128 with a first axis 45 degrees from the polarization of the pulse, along segment 129 to high reflecting mirror 130.

High reflecting mirror 130 guides the beam back along segment 129 through the quarter-wave plate 128 with the effect of rotating the polarization of the beam by 90 degrees. The beam then progresses along segment 127 along a third path through rod 2 and exits the first face 125 of rod 2 along segment 124 as a fifth pass amplified pulse.

The fifth pass amplified pulse passes through rotator 123 along segment 122 to high reflecting mirror M5.

Mirror M5 guides the fifth pass amplified pulse along segment 121 to the second face of amplifier rod 1 and proceeds along a third optical path from the second face to the first face 110 of amp rod 1. The amplified pulse leaves amp rod 1 at the first face 110 along segment 120. At polarizer 119, the sixth pass amplified pulse will be transmitted because of the rotation at the quarter-wave plate 128 and mirror M6.

To set up the six pass amplifier FIG. 4, the half-wave plate 106, Faraday isolator 115 and polarizer 119 are adjusted to achieve maximum reflectivity at the polarizer 119 of the light coming through the telescope 117. The Faraday isolator 115 and half-wave plate 106 thus may not be necessary for an input pulse having a known polarization.

The pin hole apodizer 108 is used to establish a known transverse dimension $D_i$ during experimental testing of the amplifier. The apodizer may not be required for systems in which the transverse dimension of the input pulse is well controlled.

The 90 degree rotator 123 is utilized to compensate for the effect of birefringence in the third, fourth, fifth, and sixth passes through the gain media by the pulse. In operation, the expanded pulse will pass through rod 1 and experience a birefringent effect. The 90 degree rotator 123 will rotate the resultant output by 90 degrees so that the two components will experience an opposite birefringence effect in rod 2, offsetting the effect of rod 1. The same effect occurs as the beam passes from rod 2 through the 90 degree rotator into rod. The 90 degree rotator 123 may be either reciprocal or nonreciprocal. Therefore, either a quartz rotator or a Faraday rotator could be used. The birefringence effect during the first pass of rod 1 and the first pass of rod 2 are not compensated in this embodiment because the relatively low power at that level of amplification does not cause a significant impact in the overall output power of the beam. A user may desire to include a rotator in segment 112 or 113 to provide birefringence compensation. For nonbirefringent gain media, the rotator 123 is not necessary.

Figure 6:
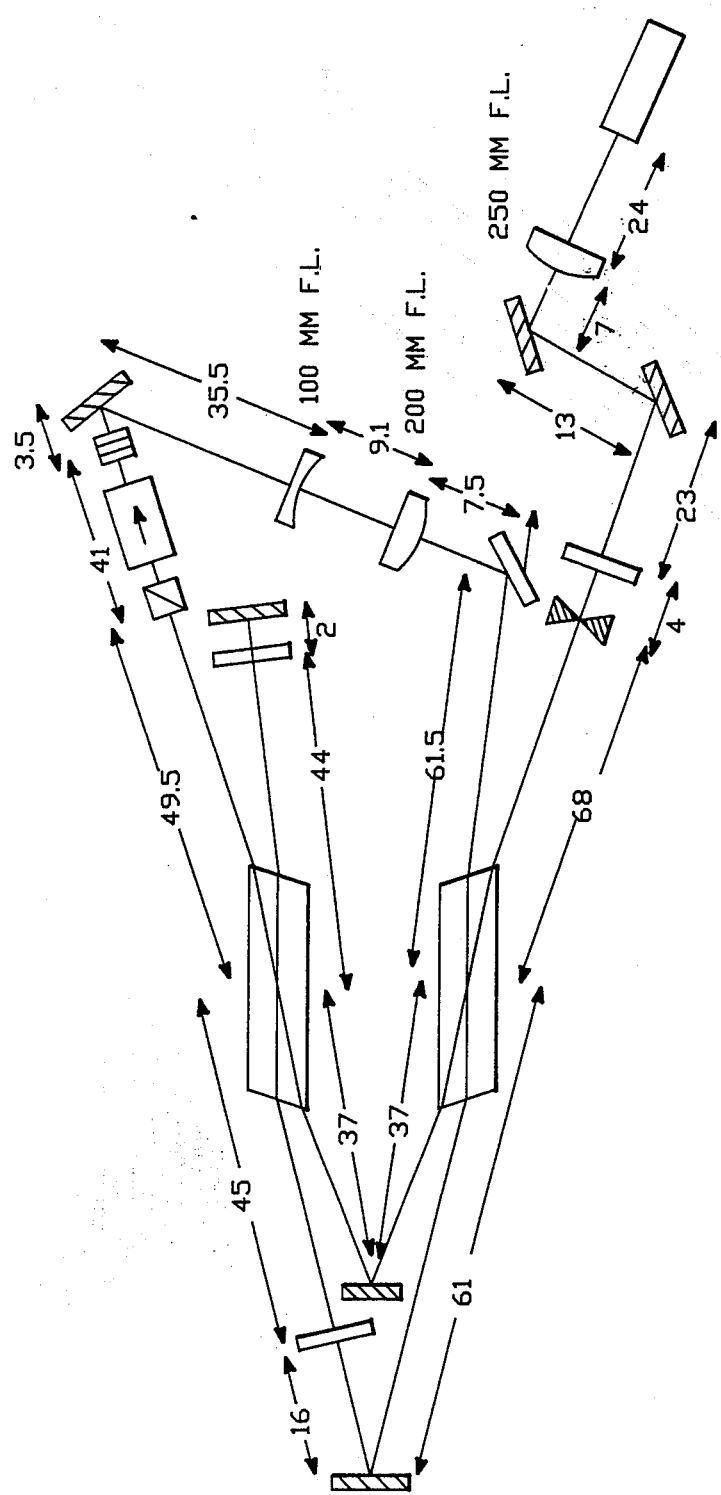
FIG. 6 is a diagram of the laser amplifier of FIG. 4, showing the dimension in centimeters of the system.

The layout dimensions of the amplifier of FIG. 4 are shown in centimeters in FIG. 6. Also, the focal lengths of the telescope lenses and the collimator lens are shown.

In operation for an input power of 5 microjoules in a 10 nanosecond pulse, the power of the second pass amplified pulse on segment 114 is in the neighborhood of 100 microjoules for a gain of approximately 20 for the first two passes through the media. The power for the pulse exiting the second face 126 of rod 2 along segment 127 is on the order of 50 millijoules for a gain on the order of 10 times for the third and fourth passes through the rod. The output beam is measured at 200 to 250 millijoules for a gain of about 4 or 5 for the final passes through the media.

FIG. 5 illustrates a five pass embodiment of a laser amplifier according to the present invention. The reference numbers used in FIG. 5 are the same for all elements that appear in FIG. 6. The system differs in that the mirror M6 is tilted slightly so that as the fourth pass amplified pulse proceeds along segment 127 to mirror M6, it is reflected along segment 201. It proceeds from the second face 126 to the first face 125 of amp rod 2 and exits as a fifth pass amplified pulse along segment 202. The pulse passes through rotator 123 along segment 203 to mirror M5. It is reflected by mirror M5 along segment 204 to a turning prism 205. The output beam is them guided along segment 206. This five pass embodiment does not rely on the polarization dimension for preventing setting up an oscillator. So, the quarter-wave plate 128 shown in FIG. 4 is not utilized. For systems requiring less power output than achieved by the system in FIG. 6, this may be a preferred design.

The polarizer 119 shown in FIG. 5 might be replaced by a high reflecting mirror if desired. However, it serves the function of filtering the effects of birefringence for the first and second passes through the rod.

In addition, the 90 degree rotator 123 has the effect of cancelling the effect of birefringence due to the first pass of the expanded pulse through rod 1 and the first pass of the expanded pulse through rod 2. However, the birefringence effect of the second pass of the expanded pulse through rod 2 is not compensated and affect the output along segment 206.

FIG. 6 is a duplicate of the schematic diagram of FIG. 4 with the dimensions in centimeters of the optical path illustrated. Also, the focal length of the lenses used in the telescope 117 are illustrated as well as the focal length of the collimator lens 102.

It will appreciated by those skilled in the art that the optics used for guiding the pulse through the amplifier according to the present invention can take on a variety of forms. The invention can be applied in laser amplifiers with two or more passes through a gain medium. First pass would be a small diameter pass along a first optical path and the second pass will be a large diameter pass along a second optical path. The polarization dimension can be utilized to achieve additional passes through the gain medium. In addition, more than one gain medium can be used while taking advantage of the optics for guiding and expanding the beam required for a single gain medium.

Telescope 117 can be adapted to provide a best possible match of the transverse dimension $D_e$ to the active region of the gain media. For a given system, asymmetrical expanders, like prism beam expanders or cylindrical telescopes, may be used. Also, additional optics may be used to provide precise shaping of the transverse dimension $D_e$, if needed.

A particular designer may desire a larger number of passes through a given gain medium to achieve the high gain and maximum energy density for the output beam. For instance, one may design the amplifier to pass the small diameter pulse through the amplifier rod at additional optical path prior to expansion. For instance, the small diameter pulse could be passed through the rod at equal and opposite angles to the longitudinal axis of the rod to achieve very high gain in two passes through the rod. The beam could then be expanded and passed through the rod along the longitudinal axis to utilize the full available volume of the gain media. A two medium amplifier could be set up using this extra pass of the small beam through the rod to achieve an eight pass amplifier.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

We claim:

1. An apparatus for amplifying a laser pulse to generate an output laser pulse, comprising:
    a gain medium having an active region, a first optical path characterized by a first axis through the active region and a second optical path characterized by a second axis through the active region and wherein the first axis intersects the second axis within the gain medium at an angle A;
    first means for supplying the laser pulse along the first optical path, so that the laser pulse has a transverse dimension $D_i$ as it propagates along the first optical path, to generate a first pass amplified pulse;
    second means for expanding the first pass amplified pulse in the transverse dimension $D_i$ to an expanded pulse with a transverse dimension $D_e$, and for guiding the expanded pulse along the second optical path, to generate the output laser pulse.

2. The apparatus of claim 1, wherein the active region has a longitudinal axis, the second axis essentially coincides with the longitudinal axis, and the transverse dimension $D_e$ results in utilization of more than 75% of the active region.

3. The apparatus of claim 1, wherein the first means comprises:
    means for apodizing the input pulse to establish the transverse dimension $D_i$.

4. The apparatus of claim 1, wherein the second means comprises:
    a telescope aligned with the first pass amplified pulse to establish the transverse dimension $D_e$.

5. An apparatus for amplifying a laser pulse to generate an output laser pulse, comprising:
    a gain medium having an active region, a first optical path characterized by a first axis through the active region, a second optical path characterized by a second axis through the active region and a third optical path through the active region, and wherein the first axis intersects the second axis inside the gain medium at an angle A;
    first means for supplying the laser pulse along the first optical path, so that the laser pulse has a transverse dimension $D_i$ as it propagates along the first optical path, to generate a first pass amplified pulse;
    second means for expanding the first pass amplified pulse in the transverse dimension $D_i$ to an expanded pulse with a transverse dimension $D_e$, and for guiding the expanded pulse along the second optical path, to generate a second pass amplified pulse; and
    third means for guiding the second pass amplified pulse along the third optical path to generate the output laser pulse.

6. The apparatus of claim 5, wherein the second and third optical paths are collinear, and the laser pulse has a first direction of propagation along the first optical path and a second direction of propagation along the third optical path.

7. The apparatus of claim 5, wherein the active region has a longitudinal axis, the second axis essentially coincides with the longitudinal axis, and the transverse dimension $D_e$ results in utilization of more than 75% of the active region.

8. The apparatus of claim 5, wherein the third optical path is characterized by a third axis, and wherein the third axis intersects the first axis within the gain medium at an angle B.

9. The apparatus of claim 8, wherein the second axis and the third axis essentially coincide.

10. The apparatus of claim 8, wherein the active region has a longitudinal axis, the third axis essentially coincides with the longitudinal axis, and the transverse dimension $D_e$ results in utilization of more than 75% of the active region.

11. The apparatus of claim 10, wherein the second axis and the third axis essentially coincide, and the laser pulse has a first direction of propagation along the first optical path and a second direction of propagation along the third optical path.

12. The apparatus of claim 5, wherein the first means comprises:
 means for apodizing the input pulse to establish the transverse dimension $D_i$.

13. The apparatus of claim 5, wherein the second means comprises:
 a telescope aligned with the first pass amplified pulse to establish the transverse dimension $D_e$.

14. The apparatus of claim 6, wherein the third means comprises:
 means for rotating polarization of the second pass amplified pulse by 90 degrees; and wherein the second means includes
 means for reflecting components of the first pass amplified pulse having a first polarization along the second optical path, and for transmitting components of the output laser pulse having a polarization rotated by 90 degrees from the first polarization along an output path.

15. An apparatus for amplifying a laser pulse to generate an output laser pulse, comprising:
 a first gain medium having a first face and a second face, a first optical path between the first face and the second face, a second optical path between the first face and the second face, and a third optical path between the first face and the second face,
 a second gain medium having a first face and a second face, a fourth optical path between the first face and the second face, a fifth optical path between the first face and the second face, and a sixth optical path between the first face and the second face,
 first means for supplying the laser pulse along the first optical path, so that the laser pulse has a maximum transverse dimension $D_i$ as it propagates along the first optical path, to generate a first pass amplified pulse;
 second means for supplying the first pass amplified pulse along the fourth optical path, to generate a second pass amplified pulse;
 third means for expanding the second pass amplified pulse in the transverse dimension to an expanded pulse with a transverse dimension $D_e$, and for guiding the expanded pulse along the second optical path, to generate a third pass amplified pulse; and
 fourth means for guiding the third pass amplified pulse along the fifth optical path to generate a fourth pass amplified pulse;
 fifth means for guiding the fourth pass amplified pulse along the sixth optical path to generate a fifth pass amplified pulse;
 sixth means for guiding the fifth pass amplified pulse along the third optical path to generate the output laser pulse.

16. The apparatus of claim 15, wherein the second and third optical paths are collinear, and the laser pulse has a first direction of propagation along the second optical path and a second direction of propagation along the third optical path.

17. The apparatus of claim 15, wherein the fifth and sixth optical paths are collinear, and the laser pulse has a first direction of propagation along the fifth optical path and a second direction of propagation along the sixth optical path.

18. The apparatus of claim 15, wherein the first optical path is characterized by a first axis and the second optical path is characterized by a second axis, and wherein the first axis intersects the second axis within the first gain medium at an angle A.

19. The apparatus of claim 15, wherein the fourth optical path is characterized by a first axis and the fifth optical path is characterized by a second axis, and wherein the first axis intersects the second axis within the second gain medium at an angle A.

20. The apparatus of claim 18, wherein the first gain medium has an active region having a longitudinal axis, the second axis essentially coincides with the longitudinal axis, and the transverse dimension $D_e$ results in utilization of more than 75% of the active region.

21. The apparatus of claim 19, wherein the second gain medium has an active region having a longitudinal axis, the second axis essentially coincides with the longitudinal axis, and the transverse dimension $D_e$ results in utilization of more than 75% of the active region.

22. The apparatus of claim 18, wherein the third optical path is characterized by a third axis, and wherein the third axis intersects the first axis within the first gain medium at an angle B.

23. The apparatus of claim 19, wherein the sixth optical path is characterized by a third axis, and wherein the third axis intersects the first axis within the second gain medium at an angle B.

24. The apparatus of claim 22, wherein the second axis and the third axis essentially coincide.

25. The apparatus of claim 23, wherein the second axis and the third axis essentially coincide.

26. The apparatus of claim 22, wherein the first gain medium has an active region having a longitudinal axis, the third axis essentially coincides with the longitudinal axis, and the transverse dimension $D_e$ results in utilization of more than 75% of the active region.

27. The apparatus of claim 23, wherein the second gain medium has an active region having a longitudinal axis, the third axis essentially coincides with the longitudinal axis, and the transverse dimension $D_e$ results in utilization of more than 75% of the active region.

28. The apparatus of claim 26, wherein the second axis and the third axis essentially coincide, and the laser pulse has a first direction of propagation along the first optical path and a second direction of propagation along the second optical path.

29. The apparatus of claim 27, wherein the second axis and the third axis essentially coincide, and the laser pulse has a first direction of propagation along the fourth optical path and a second direction of propagation along the sixth optical path.

30. The apparatus of claim 15, wherein the first means comprises:
 means for apodizing the input pulse to establish the transverse dimension $D_i$.

31. The apparatus of claim 15, wherein the third means comprises:

a telescope aligned with the second pass amplified pulse to establish the transverse dimension $D_e$.

32. The apparatus of claim 18, wherein the fifth means comprises:
means for rotating polarization of the fourth pass amplified pulse by 90 degrees; and wherein the third means includes
means for reflecting components of the second pass amplified pulse having a first polarization along the second optical path, and for transmitting components of the output laser pulse having a polarization rotated by 90 degrees from the first polarization.

33. The apparatus of claim 15, further including:
means for compensating for birefringence in the first and second gain media.

34. The apparatus of claim 15, wherein the fourth means comprises:
means for rotating polarization of the third pass amplified pulse by 90 degrees; and the sixth means comprises
means for rotating polarization of the fifth pass amplified pulse by 90 degrees, so that birefringence in the first gain medium is offset by birefringence in the second gain medium.

35. The apparatus of claim 34, wherein the fourth means comprises
a 90 degree rotating element; and the sixth means comprises the 90 degree rotating element.

36. An apparatus for amplifying a laser pulse to generate an output laser pulse, comprising:
a first gain medium having a first face and a second face, a first optical path between the first face and the second face, and a second optical path between the first face and the second face;
a second gain medium having a first face and a second face, a third optical path between the first face and the second face, a fourth optical path between the first face and the second face, and a fifth optical path between the first face and the second face,
first means for supplying the laser pulse along the first optical path, so that the laser pulse has a maximum transverse dimension $D_i$ as it propagates along the first optical path, to generate a first pass amplified pulse;
second means for supplying the first pass amplified pulse along the third optical path, to generate a second pass amplified pulse;
third means for expanding the second pass amplified pulse in the transverse dimension to an expanded pulse with a transverse dimension $D_e$, and for guiding the expanded pulse along the second optical path, to generate a third pass amplified pulse; and fourth means for guiding the third pass amplified pulse along the fourth optical path to generate as a fourth pass amplified pulse; and
fifth means for guiding the fourth pass amplified pulse along the fifth optical path to generate the output laser pulse.

37. The apparatus of claim 36, wherein the first optical path is characterized by a first axis and the second optical path is characterized by a second axis, and wherein the first axis intersects the second axis within the first gain medium at an angle A.

38. The apparatus of claim 36, wherein the third optical path is characterized by a first axis and the fourth optical path is characterized by a second axis, and wherein the first axis intersects the second axis within the second gain medium at an angle A.

39. The apparatus of claim 37, wherein the first gain medium has an active region having a longitudinal axis, the second axis essentially coincides with the longitudinal axis, and the transverse dimension $D_e$ results in utilization of more than 75% of the active region.

40. The apparatus of claim 38, wherein the second gain medium has an active region having a longitudinal axis, the second axis essentially coincides with the longitudinal axis, and the transverse dimension $D_e$ results in utilization of more than 75% of the active region.

41. The apparatus of claim 38, wherein the fifth optical path is characterized a third axis, and wherein the third axis intersects the first axis within the second gain medium at an angle B.

42. The apparatus of claim 41, wherein the second axis and the third axis are not parallel.

43. The apparatus of claim 36, wherein the first means comprises:
means for apodizing the input pulse to establish the transverse dimension $D_i$.

44. The apparatus of claim 36, wherein the third means comprises:
a telescope for expanding the second pass amplified pulse to establish the transverse dimension $D_e$.

45. The apparatus of claim 36, further including:
means for compensating for birefringence in the first and second gain media.

46. The apparatus of claim 36, wherein the fourth means comprises:
means for rotating polarization of the third pass amplified pulse by 90 degrees; and further including
means for rotating polarization of the fifth pass amplified pulse by 90 degrees, so that birefringence in the first gain medium is partially offset by birefringence in the second gain medium.

47. The apparatus of claim 46, wherein the fourth means comprises:
a 90 degree rotating element; and the means for rotation polarization of the fifth pass amplified pulse comprises the 90 degree rotating element.

* * * * *